Feb. 23, 1965   G. NORMANSELL   3,170,558
RIGHT ANGLE TRANSFER DEVICE FOR FRAGILE LAMINAR ARTICLES
Filed April 16, 1963   3 Sheets-Sheet 1
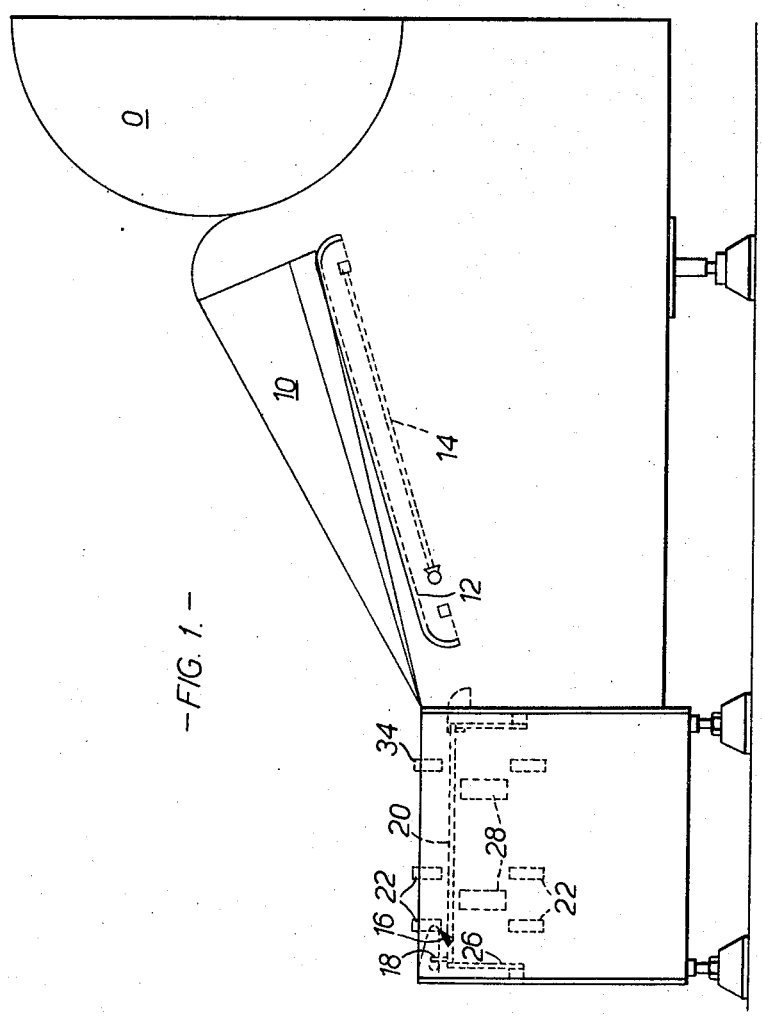
INVENTOR:
GEORGE NORMANSELL
BY
ATTORNEYS

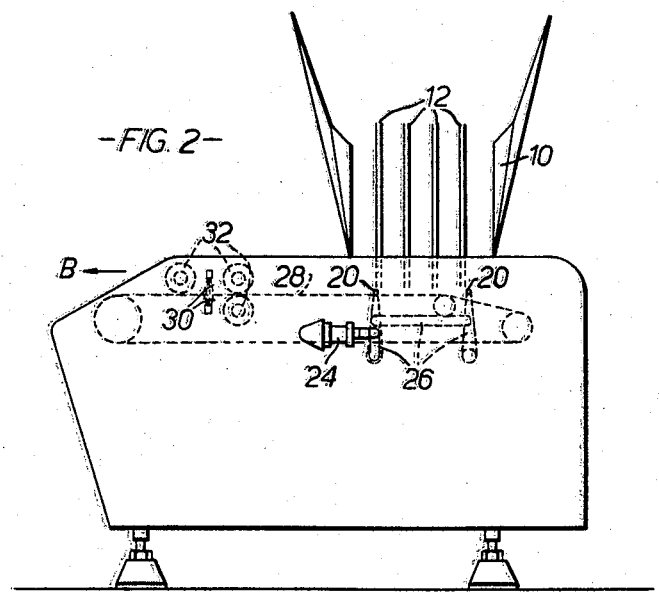

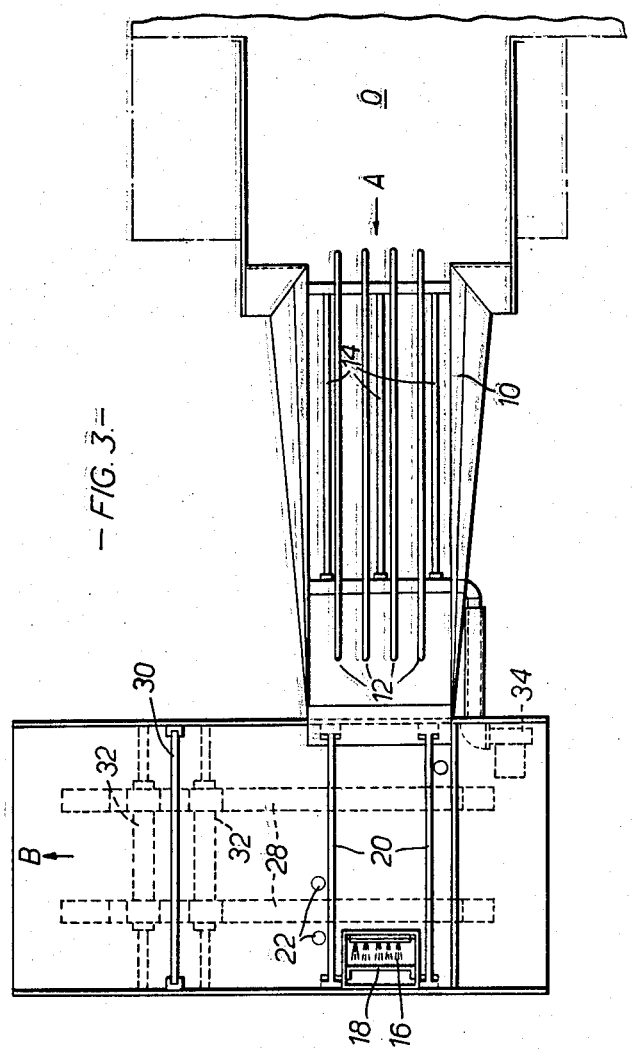

United States Patent Office 3,170,558
Patented Feb. 23, 1965

3,170,558
RIGHT ANGLE TRANSFER DEVICE FOR FRAGILE LAMINAR ARTICLES
George Normansell, Winwick, England, assignor to T. & T. Vicars Limited, Newton, Le-Willows, England, a British company
Filed Apr. 16, 1963, Ser. No. 273,433
8 Claims. (Cl. 198—29)

This invention concerns a right angle transfer device for fragile laminar articles. More particularly it relates to a device for receiving thin biscuit wafers as they are discharged from wafer baking plates leaving an oven, for cushioning and aligning them, and transferring them for movement onwardly in a direction transverse to that of their delivery from the oven.

According to the present invention a right angle transfer device for fragile laminar articles comprises a cushioned surface for initially receiving the articles and leading them to a transfer point, moveable conveyor means extending away from said transfer point in a direction transverse to that in which the cushioned surface leads the articles thereto, and guide elements located at said transfer point and moveable between an elevated position wherein they are above the active surface of said conveyor means and a retracted position wherein they are below said surface.

Preferably the guide elements are actuated by an air cylinder which is automatically operated consequent upon the presence of a laminar article at said transfer point. Such presence is conveniently detected by photo-electric cells associated with the transfer point.

The invention will be further described by way of example with reference to the accompanying drawings, wherein:

FIG. 1 is a side elevation of a device according to the present invention;

FIG. 2 is a corresponding end elevation, and

FIG. 3 is a corresponding plan view.

The biscuit wafers delivered from the wafer baking plates of an oven in the direction of the arrow A on FIG. 3 are to be transferred to a collecting box or a conveyor in the direction of the arrow B on FIG. 3. The present invention provides a device for transferring fragile laminar articles, such as thin biscuit wafers, in such circumstances and without damage thereto.

The thin biscuit wafers are stripped from the wafer baking plates (not shown) by a hot air blast. They are received in a downwardly inclined inlet channel 10, the base of which is formed by a series of spring-mounted plastic covered guides 12 which will yield to a limited extent thereby avoiding damage to the thin biscuit wafer as it is received thereon. To further obviate the possibility of damage to the wafers a series of air pipes 14 may be interspersed between the guides 12 to provide a cushioning effect which will allow the descending wafer to fall gently onto the guides.

The guides slope downwardly towards the transfer point which is located at the lower end of the inlet channel 10, and consequently the biscuits will slide towards the transfer point, and this movement will be assisted by the cushioning of air issuing from the air pipes 14.

On arrival at the transfer point the movement of the wafers in the direction of arrow A is braked by a brush 16 adjustably located on the side of transfer point remote from that at which the wafer sheets enter. Behind adjustable brush 16 a stop 18 is conveniently provided to prevent fast moving wafers from over-shooting the transfer point.

At the transfer point the wafer sheets are received on a pair of moveable guides 20, and one a wafer sheet has been positioned at the transfer point, it interrupts the beams from a pair of photo-electric cells 22 which cause actuation of a solenoid which in turn results in operation of an air cylinder 24. This cylinder is connected by means of linkages 26 to the guides 20 which, on operation of cylinder 24, are swung downwardly away from beneath the wafer sheet at the transfer point, so that the latter drops lightly onto moving conveyor belts 28 which then carry the wafer sheet onwardly in the direction of arrow B to a collecting box or to further conveying mechanisms.

Brushes 30 may be provided for cleaning the top and bottom faces of the wafer sheets as they are carried along on belts 28 and to prevent movement of the sheets whilst they are being so brushed plastic foam covered rollers 32 may be provided. These rollers may also grip the wafer sheets whilst side scrap is being removed.

As stated, belts 28 will discharge into a collecting box, and collator or further conveying apparatus.

Although the baking oven is regulated to prevent overheating of the oven wafer plates and thereby obviate the possibility of wafers adhering to the plates and not being discharged into receiving channel 10 when the plates open, it may be desirable to provide an additional photo-electric call 34 which will come into operation and energise an alarm should a wafer sheet fail to be delivered.

The supply of air for pipes 14 can be taken from an existing supply of compressed air or, alternatively the device may incorporate a fan 36 for this purpose.

I claim:

1. A right angle transfer device for fragile laminar articles comprising a cushioned surface, a transfer point, said cushioned surface being adapted to receive fragile laminar articles and to lead them to said transfer point, movable conveyor means extending away from said transfer point in a direction transverse to that in which said cushioned surface leads the articles thereto, and guide elements located at said transfer point and being movable between an elevated position wherein they are above the active surface of said conveyor means and a retracted position wherein they are below said active surface, whereby a said article received on said guide elements is deposited on said movable conveyor means.

2. A right angle transfer device as set forth in claim 1, wherein an air cylinder is automatically operated consequent upon the presence of an article at said transfer point to actuate said guide elements.

3. A device for transferring fragile laminar articles moving in one direction to another direction at right angles thereto, comprising an inlet channel having a cushioned surface, a transfer point, said inlet channel being downwardly inclined towards said transfer point and being adapted to receive articles thereon and to lead them to said transfer point, conveyor means extending away from said transfer point and movable in a direction transverse to the direction in which said inlet channel leads the articles to said transfer point, guide elements located at said transfer point and movable between a position above said conveyor means and a position below said conveyor means, photocells positioned at said transfer point, a solenoid adapted to be actuated by said photocells when an article is detected at said transfer point, and an air cylinder operable by said solenoid to actuate said guide elements, whereby a said article received on said guide elements is deposited on said movable conveyor means.

4. A right angle transfer device for fragile laminar articles comprising an inlet channel for receiving the laminar articles, said channel having a base formed as a cushioned surface, said cushioned surface comprising a series of resiliently mounted plastic covered support members which yield to a limited extent when an article is received thereon and a series of gas pipes interspersed between said members to provide a gas cushioning effect which allows an article to fall gently onto said members, a transfer point, said inlet channel being downwardly inclined towards said transfer point to lead articles thereto, means for braking the movement of the articles on arrival at said transfer point, movable conveyor means extending away from said transfer point in a direction at right angles to the direction at which articles are led thereto, guide elements located at said transfer point and being movable between an elevated position above said conveyor means and a retracted position below said conveyor means, said guide elements being adapted to receive an article in the elevated position and on the article being detected are actuated to move to said retracted position whereby the article is deposited on said conveyor means, and means for detecting the presence of an article at said transfer point.

5. A device as set forth in claim 4, wherein said conveyor means comprises two parallel endless conveyor belts and said means for detecting comprises a pair of photocells positioned at said transfer point.

6. A device as set forth in claim 4, wherein said means for braking comprises a brush adjustably located on the side of said transfer point remote from that at which the articles are led thereto, and a stop positioned behind said brush to prevent articles overshooting said transfer point.

7. In a right angle transfer device for fragile laminar articles, the combination comprising an inlet channel, a transfer point, said inlet channel being adapted to receive laminar articles thereon and to lead them to said transfer point, means for arresting the movement of the articles on arrival at said transfer point, conveyor means for moving the articles away from said transfer point at right angles to the direction in which the articles are led thereto, said inlet channel having a base comprising a plurality of resiliently mounted support members and a plurality of pipes for supplying air, said base acting as a cushioned surface for articles received thereon, movable guide elements located at said transfer point, photo cells positioned at said transfer point for detecting the presence of an article at said transfer point, means operable in response to an article being detected for moving said guide elements from above said conveyor means to below said conveyor means whereby the article is deposited on said conveyor means, brushes for cleaning the tops and bottoms of the articles carried along by said conveyor means, and means for preventing movement of the articles relative to said conveyor means when the articles are being brushed.

8. A device as set forth in claim 7, wherein the means for preventing the movement of the articles comprises a series of brushed foam plastic rollers.

References Cited by the Examiner
UNITED STATES PATENTS

| | | | |
|---|---|---|---|
| 1,575,207 | 3/26 | Hungerford | 198—29 |
| 2,578,314 | 12/51 | Mueneb | 198—29 |

SAMUEL F. COLEMAN, *Primary Examiner.*

WILLIAM B. LA BORDE, *Examiner.*